J. GLANZ.
CRANK PEDAL.
APPLICATION FILED SEPT. 30, 1919.
1,352,446.
Patented Sept. 14, 1920.
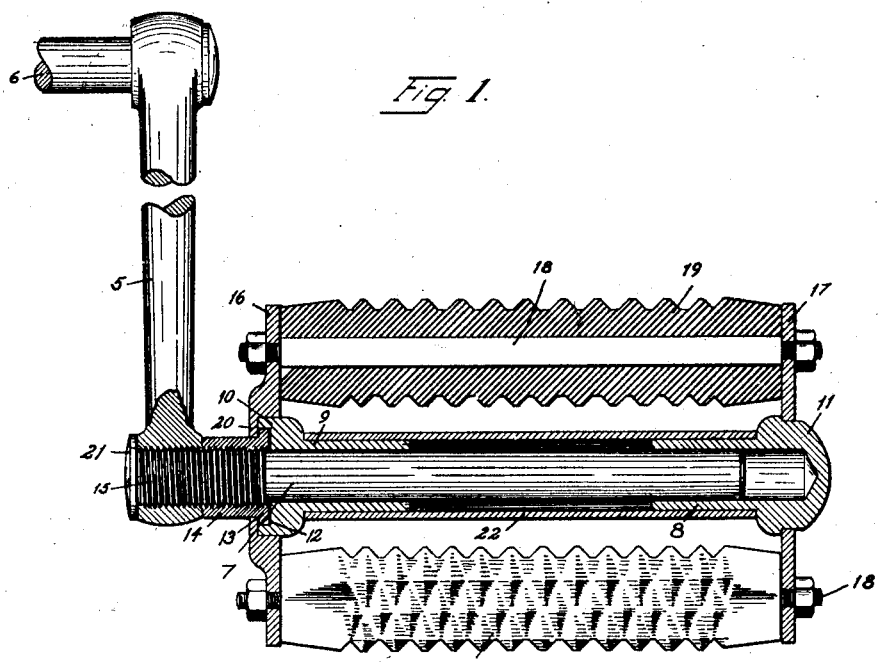
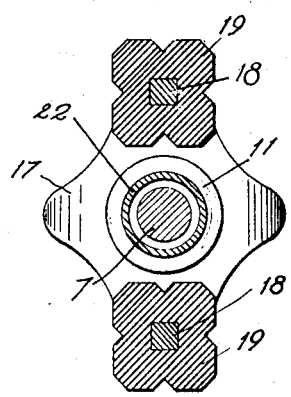
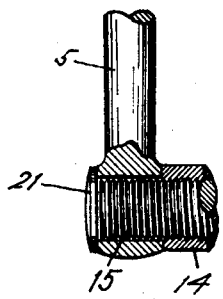
INVENTOR.
Joseph Glanz,
BY
Arthur B. Jenkins,
ATTORNEY.

UNITED STATES PATENT OFFICE.

JOSEPH GLANZ, OF HARTFORD, CONNECTICUT.

CRANK-PEDAL.

1,352,446. Specification of Letters Patent. Patented Sept. 14, 1920.

Application filed September 30, 1919. Serial No. 327,470.

*To all whom it may concern:*

Be it known that I, JOSEPH GLANZ, a citizen of the United States, residing in Hartford, in the county of Hartford and State of Connecticut, have invented a new and Improved Crank-Pedal, of which the following is a specification.

My invention relates to the class of devices employed to receive the pressure of a foot for the transmission of power to a crank, especially the crank of a bicycle or like vehicle, and an object of my invention, among others, is to reduce the cost of manufacture of such pedals to a minimum; and a further object of the invention is to provide a construction whereby my improved pedal may be readily attached to the cranks of bicycles now in common use whether or not the thread therein has become worn.

One form of pedal embodying my invention and in the construction and use of which the objects herein set out, as well as others, may be attained, is illustrated in the accompanying drawings, in which—

Figure 1 is a view in central longitudinal section through a pedal embodying my invention.

Fig. 2 is a view in cross section through the same.

Fig. 3 is a detail view illustrating the method of attaching my improved device to a crank, the thread in the opening in which has been worn.

In the accompanying drawings the numeral 5 indicates a crank or support that, in the structures now commonly used, is frequently integral with the crank shaft, such shaft 6 in bicycle construction being rotatably mounted in the crank hanger of the bicycle in a manner that will be readily understood and for which reason a detailed illustration and description is omitted herein. It is common in the structures referred to to secure the spindle of the pedal in a screw threaded opening in the end of the crank, said spindle, of course, being threaded to fit said screw threaded opening. In use the thread in the opening in the end of the crank frequently becomes so worn that the spindle will not be retained in place, and when such result occurs, it is not only necessary to replace the injured pedal with a new one, but the entire crank shaft and two cranks must also be replaced.

My invention illustrated and described herein obviates this objectionable feature and provides means whereby the original crank shaft and attached cranks may be retained, thereby also reducing the labor required to replace a pedal and at the same time means are provided for quickly replacing the pedal, the thread on the spindle of which has been destroyed.

To this end my improved pedal comprises a spindle 7 upon the opposite ends of which bearing sleeves 8—9 are received, said bearing sleeves being of a length to engage comparatively short lengths of the spindle and thereby reduce the amount of contacting surface between the sleeve and spindle. Each of these sleeves has a head 10—11, the former having a recess 12 to receive the flange 13 of a connecting nipple 14 screw threaded onto the screw threaded end 15 of the spindle 7. The opening in the sleeve 8 is closed within the head 11, and the end of the spindle 7 is preferably located at some distance from the inner end of the opening in said sleeve.

In addition to the parts hereinbefore described, the frame of the pedal comprises end plates 16—17, the latter being a cupped end plate, said plates being joined by rods 18, which rods have mounted upon them grips 19 of usual form and construction. The plate 16 is recessed to receive the head 10 of the bearing sleeve 9, this recess providing a retaining flange 20 that overlies the flange 13 on the nipple 14, whereby the end plate 16 is rotatably secured in place, and the other pedal members are secured against removal to the end plate 16. The head 11 of the sleeve 8 projects through an opening in the end plate 17, the latter being seated against a shoulder on said head and being secured against said shoulder by means of the nuts on the rods 18, the grips 19 being held between the plates 16 and 17. An inclosing sleeve 22 may be employed to retain the bearing sleeves 8 and 9 in spaced relation and also to inclose the spindle and said sleeve against the entrance of dust and dirt and also to retain a lubricant therein.

In my improved pedal herein shown the spindle 7 is threaded from its inner end inwardly for a distance equal to the thickness of the crank and the length of the connecting nipple 14 and the outer end of the spindle is not secured to the pedal, but the latter is free to be removed from the spindle when the nipple 14 is loosened. Such a structure will enable this pedal to be secured to cranks in the first instance, but in case a bicycle shall be equipped in the first instance with common forms of pedals in which the spindle is screw threaded into the crank and held by such means, then when the thread in the opening in the end of the crank becomes worn my improved pedal may be quickly attached to such crank, the other pedal being removed, the spindle head 21 resting against one side of the crank and the connecting nipple 14 being secured tightly against the opposite side of the crank.

In attaching my improved pedal, if the hole in the crank is provided with a thread the spindle 7, that has been detached from the pedal, is screwed into such hole until the head 21 tightly engages one side of the crank. The pedal is then placed upon the opposite end of said spindle, the nipple 14 is engaged with the screw thread 15 and screwed tightly up against the opposite face of the crank, the nipple being of angular shape to receive a wrench as a means for turning it. In case the thread on the opening in the end of the crank has become worn sufficiently, the spindle is simply inserted through such opening and the nipple screwed to place as before described.

It will be noted that an important feature of my invention resides in the spindle 7 having the head 21 by means of which spindle the pedal is rotatably supported and which pedal is freely removable intact and as a unit from said spindle support. I contemplate as within my invention any means for securing the pedal for support by this spindle so long as my improved means herein illustrated and described are employed for holding the spindle in place.

In accordance with the provisions of the patent statutes, I have described the principles of operation of my invention, together with the device which I now consider to represent the best embodiment thereof; but I desire to have it understood that the device shown is only illustrative, and that the invention may be carried out by other means.

I claim—

1. A pedal structure comprising a pedal supporting spindle, a bearing rotatable on said spindle, a pedal frame supported on said bearing, and means independent of the pedal frame detachably engaging said spindle to secure it in place and loosely engaging said pedal frame to rotatably retain it on the spindle.

2. A pedal structure comprising a headed pedal supporting spindle, means coöperating with the spindle head to secure said spindle in an opening in a support, and a pedal frame independent of said means mounted on said spindle and rotatably retained thereon by engagement with said means.

3. A pedal structure comprising a headed spindle with a thread thereon at a distance from said head, a pedal frame rotatably mounted on said spindle, and means independent of the mounting of the pedal frame engaging said thread to clamp the spindle head against a support, said pedal frame being rotatably interlocked with said means and retained on the spindle thereby.

4. A pedal structure comprising a spindle, means for securing said spindle to a support, a pedal frame mounted on said spindle and freely detachable therefrom at the outer end thereof, said pedal having recess, an annular part of each securing means including a member having a flange extending into said annular recess to retain the pedal in place, said member being secured to said spindle.

5. A pedal structure comprising a headed spindle having a thread at a distance from said head, a pedal frame mounted on said spindle and freely detachable therefrom at the outer end thereof, said pedal having a flanged recess, and a member having a flange located in said recess to retain said frame in place, said member fitting said screw thread to press said head against a support.

6. A pedal comprising a frame including end pieces, means for connecting said end pieces, bearing sleeves supporting said end pieces and spaced apart, a spindle extending through one of said sleeves and into the opposite sleeve, said sleeves comprising the bearing for said pedal, the latter being freely detachable from said spindle at the outer end thereof, means for retaining said sleeves in spaced relation, and a member secured to a threaded portion of said spindle and rotatably engaging said frame to hold it in place.

7. A pedal structure comprising a spindle, a pedal frame mounted on said spindle, and means rotatably carried by the pedal frame for securing said frame to the spindle, said means being operable independently of the pedal frame and movable therewith longitudinally of the spindle to remove the pedal frame intact from the spindle.

8. A pedal structure having an opening extending inwardly from one end thereof, a spindle freely movable into said opening and unsecured to the pedal at its outer end, means for securing the pedal at the inner end of the spindle, and means coöperating with the pedal securing means for securing said spindle to a support.

9. A pedal having an opening extending inwardly from one end thereof, a spindle freely movable into said opening and unsecured to the pedal at its outer end, and means rotatably carried by the pedal for securing the pedal at the inner end of the spindle and for securing said spindle to a support.

JOSEPH GLANZ.